Oct. 13, 1959 L. J. GRANKE ET AL 2,908,368
CLUTCH PLATE STRUCTURE
Filed June 25, 1956 3 Sheets-Sheet 1
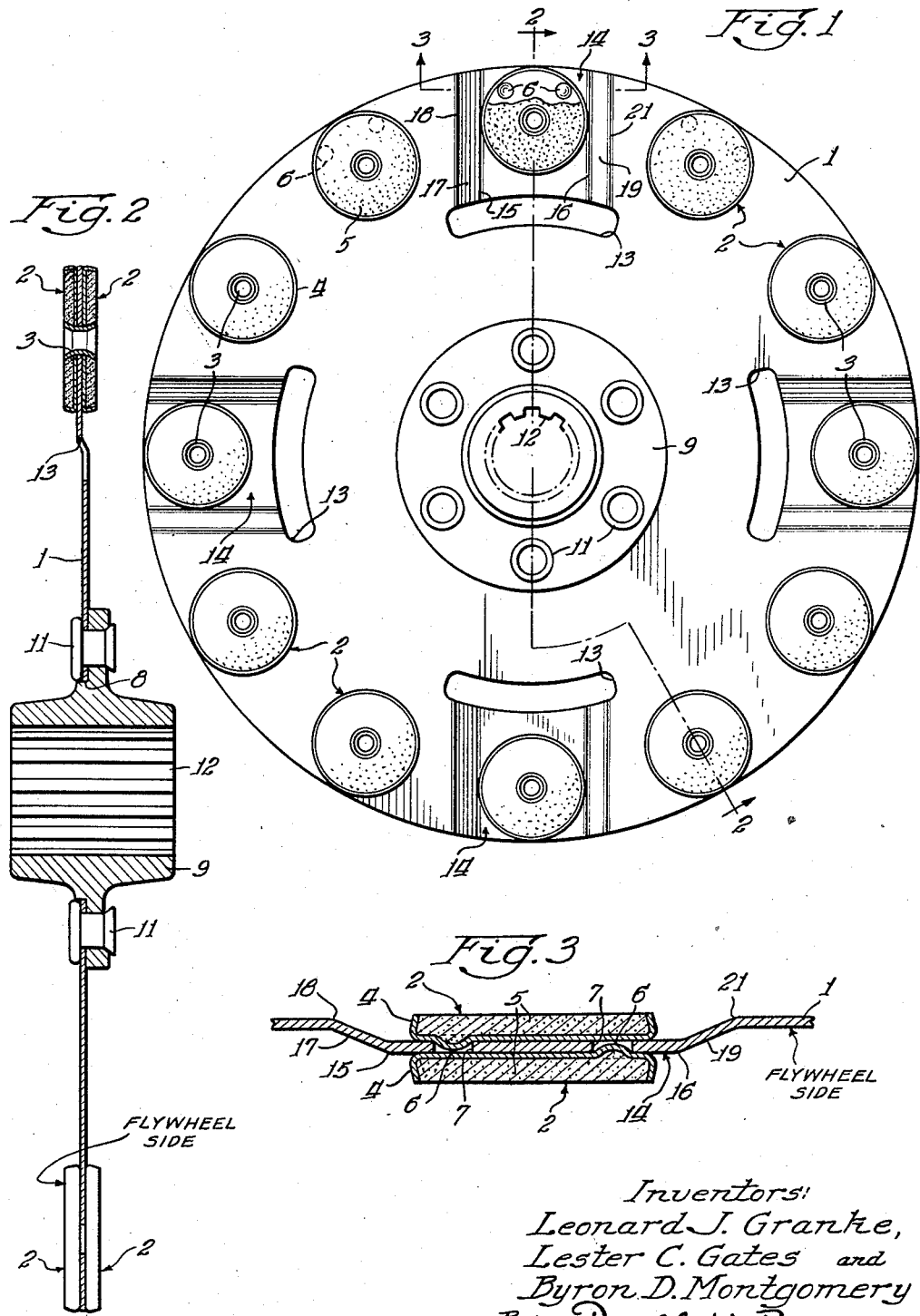
Inventors:
Leonard J. Granke,
Lester C. Gates and
Byron D. Montgomery
By: Donald W. Banner Atty Oct. 13, 1959
L. J. GRANKE ET AL
2,908,368
CLUTCH PLATE STRUCTURE
Filed June 25, 1956
3 Sheets-Sheet 2
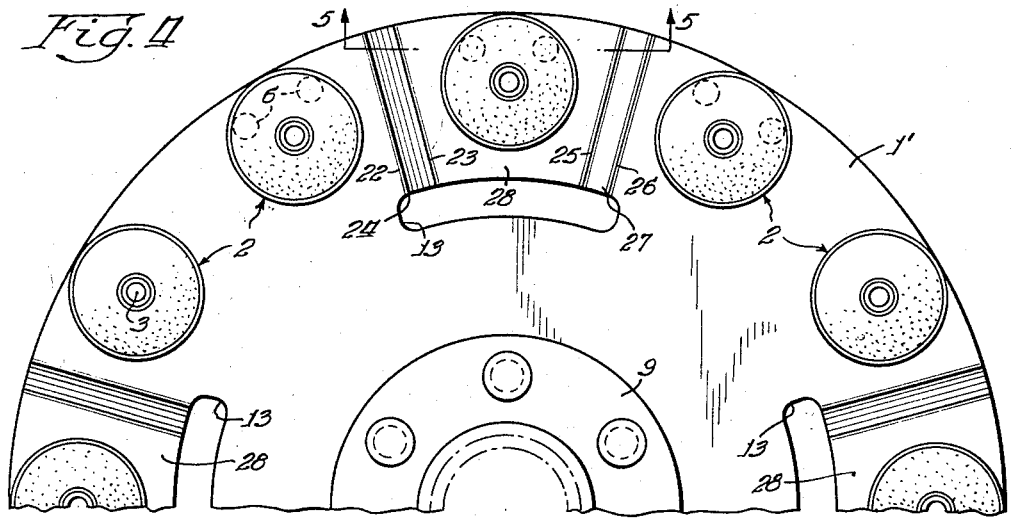
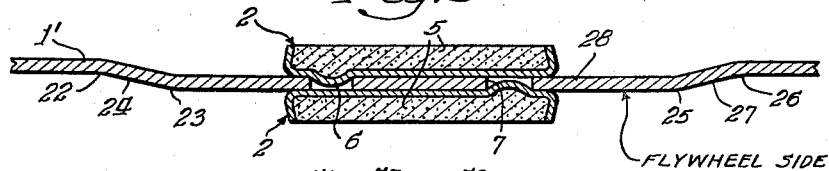
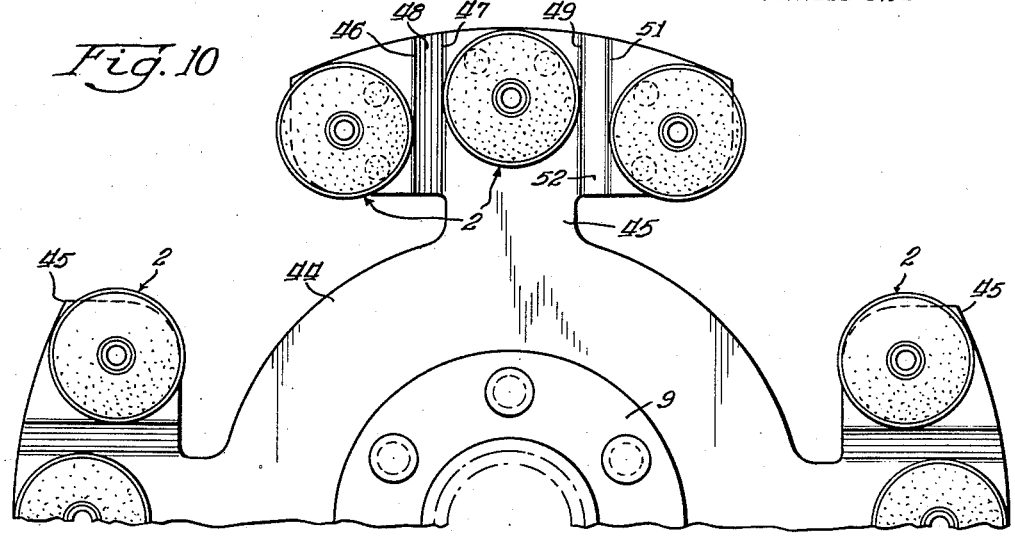
Inventors:
Leonard J. Granke,
Lester C. Gates and
Byron D. Montgomery
By: Donald W. Banner Atty.

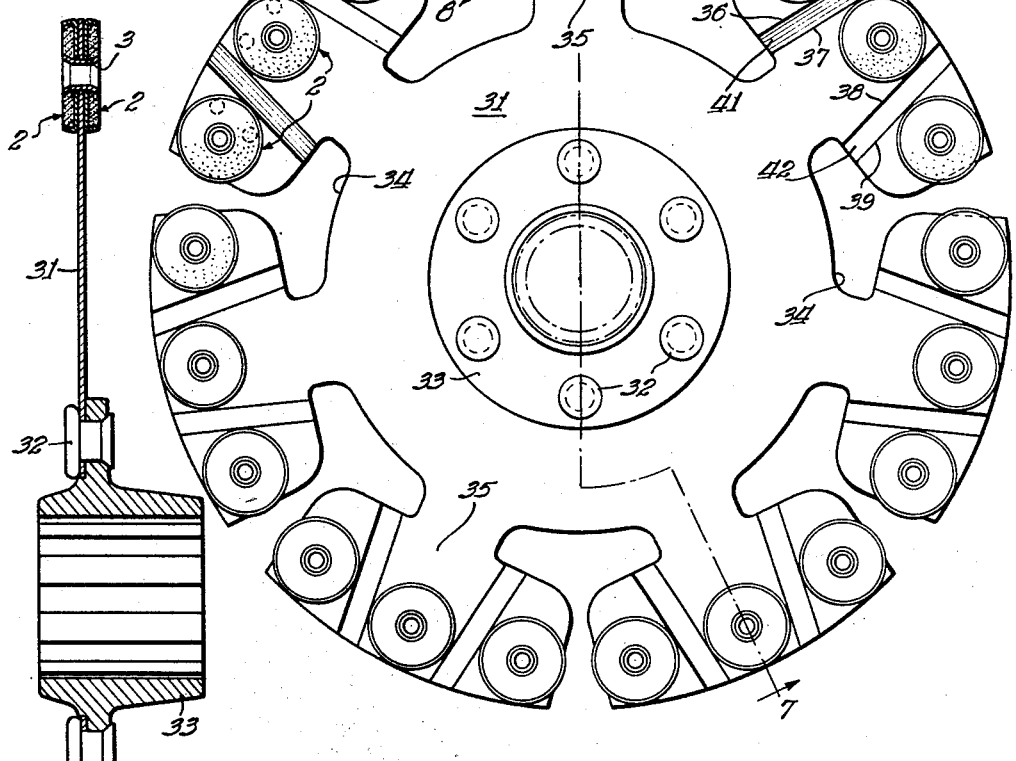

United States Patent Office 2,908,368
Patented Oct. 13, 1959

2,908,368

CLUTCH PLATE STRUCTURE

Leonard J. Granke, Birmingham, Lester C. Gates, Harper Woods, and Byron D. Montgomery, Berkley, Mich., assignors to Borg-Warner Corporation, Chicago, Ill., a corporation of Illinois Application June 25, 1956, Serial No. 593,760

5 Claims. (Cl. 192—107)

This invention relates to clutch plates, and more particularly to driven clutch plates having a plurality of Cerametallic discs mounted thereon with portions of the plates upon which certain of the discs are disposed being resiliently connected to the remaining portion of the plate.

Cerametallic friction material is well known, and is supplied in circular briquettes or buttons enclosed in a steel, or other metal, stamping. This material is intended primarily for heavy service causing high operating temperatures. When these buttons are attached to a flat disc, under some types of heavy service the arrangement is unsatisfactory due to excessive wear on the Cerametallic material and a tendency to score the cast iron surfaces engaged thereby. In addition, the operation of the device in which the clutch is installed is difficult inasmuch as the operator does not have the ability to control the engagement of the clutch to the requisite degree. This is explained by the fact that the material itself is relatively hard and offers no resiliency and when the discs are flat they likewise have no resiliency. The clutch therefore is either engaged or disengaged and it is substantially impossible to control engagement of the clutch with the degree of smoothness required for good maneuverability. In addition, variations in the wear of the buttons occur due to the fact that in heavy service, where considerable heat is generated, there is a tendency for the flywheel and pressure plate surfaces to dish concavely toward each other, this change in shape of these surfaces altering the loading on the buttons so as to cause them to wear unevenly.

It is therefore one object of the present invention to provide a new and improved clutch member having Cerametallic friction elements mounted thereon which will operate in such a manner that the clutch may be engaged and disengaged smoothly.

Another object in accordance with the preceding object is the provision of a device formed of a relatively flat steel plate having Cerametallic discs mounted thereupon in generally circular array with certain of the discs being movable axially with respect to others.

Other objects and features of the invention will be readily apparent to those skilled in the art from the specification and appended drawings illustrating certain preferred embodiments in which:

Figure 1 is an elevational view of a driven clutch member incorporating the principles of the present invention;

Figure 2 is a sectional view along the plane of line 2—2 of Figure 1;

Figure 3 is a sectional view along the plane of line 3—3 of Figure 1;

Figure 4 is a partial view illustrating a modified embodiment of the present invention;

Figure 5 is a sectional view along the plane of line 5—5 of Figure 4;

Figure 6 is a side elevational view of a further modified form of a driven clutch plate incorporating the principles of the present invention;

Figure 7 is a sectional view along the plane of line 7—7 of Figure 6;

Figure 8 is an enlarged sectional view along the plane of line 8—8 of Figure 6;

Figure 9 is an enlarged end view along the plane of line 9—9 of Figure 6;

Figure 10 is a partial elevational view similar to Figure 6 showing a further modification of the present invention.

Referring first to the embodiment of the invention illustrated in Figures 1 through 3, there is disclosed therein a circular steel plate 1, having a plurality of circular Cerametallic discs or buttons 2 mounted thereto. As illustrated best in Figures 2 and 3, pairs of discs 2 are provided in alignment on the front and back surfaces of the plate 1, respectively, and are attached thereto by central rivets 3. Each of the discs 2 comprises a circular casing 4 within which is disposed the Cerametallic friction material 5. The inner surface of each of the casings 4 is provided with an integral protrusion 6 which is received in a suitable cooperating opening 7 in the plate 1 to prevent rotation of the disc 2. The plate 1 is provided with a circular, centrally located opening 8 therein, the sides of the opening being seated upon a cooperating, complementary ledge formed on a hub member 9, to which the plate 1 is fixedly attached by rivets 11. The hub member 9 is provided with a central, longitudinally extending opening therein provided with splines 12 which are adapted to cooperate with a suitable mounting member, as is readily apparent to those skilled in the art.

The plate 1 is substantially flat, but is provided with four symmetrically spaced arcuate slots 13 extending therethrough intermediate opening 8 and the outer periphery. As illustrated in Figure 2, the portion of the plate 1 radially outward of each of these slots 13—indicated by the number 14—is offset with respect to the remainder of the plate 1. The portions 14 respectively carry a pair of discs 2 on the opposite sides thereof, mounted thereto as previously described. Each of portions 14 is defined on one side by a straight edge 15 and on the other by a parallel edge 16, edges 15 and 16 respectively being substantially tangential to the periphery of discs 2 mounted on portion 14. Adjacent edges 15, respectively, is an inclined portion 17 terminating in an edge 18 coplanar with the main body portion of plate 1. Similarly, adjacent edges 16, respectively, is an inclined portion 19 terminating in an edge 21 coplanar with the body of plate 1. It is obvious that the length and degree of offset of the surfaces 17 and 19 defining the degree of offset of the portions 14 and discs 2 associated therewith, and that such length and degree of offset may be varied to suit particular operational requirements. It is also obvious that the inner edges of each of the portions 14 are not connected to plate 1; as a result, when plate 1 is squeezed between two flat plates, surfaces 17 and 19 will flex to bring portions 14 into alignment with the main body portion of plate 1.

With this arrangement, when the clutch is to be moved into its "engaged" condition, it will be seen that as the plate 1 is engaged by the pressure plate, the engagement which occurs will be a cushioned one inasmuch as certain of the discs 2 are initially offset with respect to the remaining discs 2 upon the plate 1. In addition, it should be noted that the designation "flywheel side" on Figure 3 indicates that the offset of the surfaces 17 and 19 is in a direction to result in fewer discs 2 engaging initially on the flywheel side than on the opposite "pressure plate side"; in other words, the surfaces 17 and 19 are so arranged that those discs 2 which are mounted upon portions 14 are spaced axially in a direction toward the flywheel when the plate 1 is mounted in an operative clutch assembly. As a matter of fact, with the particular configuration illustrated in Figure 1, upon initial contact conditions twice as many discs 2 will contact on the pressure plate side as on the flywheel side. This is an advantageous arrangement in many installations inasmuch as when a clutch is released, the driven member tends to drift away from the flywheel. Upon reengagement, the pressure plate contacts the plate 1 and must move it forward against the resistance of friction of the splines in order to bring the "flywheel side" of the driven member into contact with the flywheel. With the construction shown and described herein, not only is there resilient offsetting provided, which results in cushioned engagement and disengagement of the clutch by virtue of the flexing of the surfaces 17 and 19, but in addition this offset is effected in such a direction that the excessive wear frequently found on the pressure plate side of the driven member is compensated for.

In Figures 4 and 5 there is illustrated a modified form of the present invention, in which there is provided a circular plate 1' mounted upon a hub 9 as previously described, the plate 1' carrying a plurality of Cerametallic buttons 2 around its edge in the manner previously described. The plate 1' is also provided with the four arcuate slots 13 extending therethrough as previously described, but in this modification, there are provided radially extending edges 22 and 23 extending from each of the slots 13 to the outer periphery of the plate 1' and defining therebetween an inclined surface 24. Similarly near the opposite end of each of the arcuate slots 13 there are other radial extending edges 25 and 26 which define therebetween an inclined surface 27 extending from the slot 13 to the outer periphery of the plate 1'. Surfaces 24 and 27 define the opposite sides of offset portions 28, each of which mounts a pair of discs or buttons 2. It will be obvious to those skilled in the art that the surfaces 24 and 27 flex upon engagement and disengagement of the clutch to provide the cushioned engagement and disengagement desirable in clutch operation. It will further be obvious that while only a partial showing of the modification is made in Figure 4, that it is contemplated that there be a plurality of Cerametallic discs 2, offset edges 24, 27 and arcuate slots 13, as indicated in Figure 1. In addition, the offset of portions 28 is in a direction away from the drive plate, when plate 1' is assembled in an operative clutch environment.

Considering now the embodiment in the present invention illustrated in Figures 6 through 9 there is disclosed a steel plate 31 fixedly attached by rivets 32 to a splined hub 33, the plate 31 being provided with a plurality of generally T-shaped slots 34 protruding therein, as illustrated in Figure 6, to define a plurality of individual spokes 35.

On each spoke 35 are mounted three Cerametallic discs 2 in the manner aforementioned with regard to the first described embodiment, the central disc 2 on each of the spokes 35 being mounted upon a portion of the plate 31 which is co-planar with the main body portion of the plate 31, as may be seen by consideration of Figure 7. Adjacent the central disc 2 on each spoke, however, is another disc 2 which is offset rearwardly, in the view of Figure 6. To accomplish this, each of the spokes 35 is bent along edges 36, 37, 38 and 39, the edges 36 and 37 defining an inclined surface 41 while edges 38 and 39 define an inclined surface 42. It will be obvious to those skilled in the art that the inclined surfaces 41 and 42 will flex upon engagement and disengagement of the clutch. As a result, the engagement and disengagement of the clutch incorporating the modification of the present invention illustrated in Figures 6 through 9, will be accomplished resiliently and smoothly, and the driven plate member 31 having—once again—twice as many friction surfaces for initial engagement on the driven plate side as on the flywheel side.

In Figure 10 there is a modification of the present invention which is similar to that illustrated in Figures 6 through 9, but differing therefrom in that there is provided a driven member 44 of steel adapted to be mounted upon a suitably splined hub, the driven member having four spokes 45 projecting symmetrically therefrom separated by generally T-shaped openings in the plate. Each of the spokes 45 has mounted thereon three of the Cerametallic discs 2 in the manner previously described, the central disc 2 on each spoke 45 being mounted upon a portion of the plate 44 which is coplanar with the central portion of that plate. Each of spokes 45, however, is bent along straight edges 46 and 47 extending throughout the radial length of the spoke 45 to define a surface 48 inclined rearwardly away from the flywheel side of the driven member 44. Similarly, straight edges 49 and 51 are provided on the opposite side of the central disc 2 on each spoke 45 which define an inclined surface 52 extending across the spoke 45 and being directed rearwardly to position the outermost button 2 rearwardly away from the flywheel side of the plate 44. It will be seen with this modification of the invention, once again, cushioned engagement and disengagement of the device occurs by virtue of the surfaces 48 and 52; in addition it also will be seen that, once again, twice as many friction surfaces are presented to the driven member, upon initial engagement condition of the clutch in which plate 44 is assembled, as to the flywheel member to compensate for the undesirable wear condition previously described.

It will therefore be seen that with each of the embodiments of the present invention, the plate member is provided with integral, offset portions formed by inclined surfaces communicating with the outer periphery of the disc and an internal opening therein, these inclined surfaces flexing upon engagement and disengagement of the clutch to effect a desired cushioned engagement thereof. In addition, the offset provided is in a direction such that the driving plate will contact twice as many friction surfaces upon initial engagement with the driven member as will be presented by the driven member to the flywheel. The thickness of the plates or the inclined surfaces may be varied to provide the desired degree of flexibility.

While the present invention has been disclosed in connection with a solid hub center, it should be understood that a vibration dampener type of center, of the general type illustrated in the United States Patent Number 2,246,156 issued to Ernest E. Wemp on June 17, 1941, may also be employed.

Where the term "Cerametallic" is used herein, reference is had to friction material similar to that described in United States Patent No. 2,784,105 issued to F. E. Stedman et al. on March 5, 1957, and entitled "Friction Lining Compositions."

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. A clutch plate comprising a main body section, a plurality of integral parts normally spaced axially of said main body section, and a plurality of inclined portions integral with said plate disposed between said parts and said main body section; a plurality of opening defining means in said plate respectively between said main body section and said parts whereby said parts are connected to said main body section solely by said inclined portions and are movable into the plane of said main body section upon flexure of said inclined portions, a plurality of metal cups respectively containing Cerametallic friction-material, means mounting certain of said cups to said main body section, and means mounting other of said cups to said parts.

2. The clutch plate defined in claim 1 in which said opening defining means form arcuate openings extending through the plate and in which said inclined portions are formed in pairs respectively parallel to each other.

3. The clutch plate defined in claim 1 in which said opening defining means form arcuate openings extending through the plate, and in which said inclined portions extend radially with respect to the plate.

4. The clutch plate defined in claim 1 in which said opening defining means form generally T-shaped openings in said plate forming radially projecting spokes, and in which said parts and inclined portions form portions of said spokes.

5. A clutch plate comprising a main body section, a plurality of integral parts normally spaced axially of said main body section, and a plurality of flexible and inclined portions integral with said plate disposed between said parts and said main body section whereby said parts are integrally connected to said main body section, a plurality of opening defining means in said plate respectively disposed between said main body section and said parts whereby said parts are connected to said main body section solely by said inclined portions and are movable into the plane of said main body section upon flexure of said inclined portions, a plurality of generally circular metal cups respectively containing Cerametallic friction material, means mounting aligned and coaxial pairs of said cups to opposite sides of said main body section, and means mounting aligned and coaxial pairs of other of said cups to opposite sides of said parts.

References Cited in the file of this patent

UNITED STATES PATENTS

| 1,727,841 | Raviolo | Sept. 10, 1929 |
| 2,307,006 | Wemp | Dec. 29, 1942 |
| 2,646,151 | Wellman | July 21, 1953 |

FOREIGN PATENTS

| 1,105,458 | France | July 6, 1955 |

OTHER REFERENCES

Cerametallic, catalogue form 12–209, copyright 1953. (Copy in 192–107M.)